(12) United States Patent
Vazquez

(10) Patent No.: US 10,368,494 B2
(45) Date of Patent: Aug. 6, 2019

(54) ANGLED EDGING TOOL

(71) Applicant: Eleuterio A Vazquez, North Chicago, IL (US)

(72) Inventor: Eleuterio A Vazquez, North Chicago, IL (US)

( * ) Notice: Subject to any disclaimer, the term of this patent is extended or adjusted under 35 U.S.C. 154(b) by 0 days.

(21) Appl. No.: 15/689,342

(22) Filed: Aug. 29, 2017

(65) Prior Publication Data
US 2019/0059236 A1    Feb. 28, 2019

(51) Int. Cl.
*A01G 3/06*    (2006.01)

(52) U.S. Cl.
CPC .................... *A01G 3/065* (2013.01)

(58) Field of Classification Search
CPC ...................................... A01G 3/065
USPC ............................................. 172/13
See application file for complete search history.

(56) References Cited

U.S. PATENT DOCUMENTS

| | | | | |
|---|---|---|---|---|
| 173,399 A * | 2/1876 | Engle | ....................... | A01B 1/20 172/375 |
| 1,344,256 A * | 6/1920 | Blackman | .............. | A01B 1/222 172/372 |
| 1,928,347 A * | 9/1933 | Cooley | .................... | A01B 1/20 172/375 |
| 5,984,393 A * | 11/1999 | Washington | ............. | A01B 1/02 294/53.5 |
| 6,684,459 B2 * | 2/2004 | Dickhaus | ................. | A01B 1/02 16/430 |
| 9,775,271 B2 * | 10/2017 | Bartnik | .................... | A01B 1/02 |

\* cited by examiner

*Primary Examiner* — Tara Mayo-Pinnock
(74) *Attorney, Agent, or Firm* — Faegre Baker Daniels LLP

(57) ABSTRACT

An angled edging apparatus or tool includes a spade connected to a handle at an angle. The angled edging apparatus allows a user to establish and maintain an edge or boundary around a garden with a minimum amount of effort and time.

17 Claims, 3 Drawing Sheets

ANGLED EDGING TOOL

FIELD OF THE DISCLOSURE

The disclosure relates generally to landscaping or gardening equipment, and more particularly, to a tool for establishing edges or boundaries around an area, such as a flowerbed, garden, or similar feature.

BACKGROUND

Gardening tools have long been used to define boundaries, for example to separate a lawn from garden beds containing flowers, shrubs, trees, etc. One type of tool is known as an edger, which can be either manual or motorized. While conventional edgers are generally up to the task, they can be time and energy consuming or may require certain skills to operate. Accordingly, what is needed is an edging tool that is easy to manipulate, requires a minimum of force to use, is comfortable to handle, and reduces the time involved in creating the edge and cleaning up the completed edge.

SUMMARY

According to one embodiment of the present disclosure, an angled edging apparatus or edging tool is provided, including a spade and a handle. One end of the handle includes a connecting member. The connecting member has an end segment that is angled with respect to the handle. The spade is attached to the angled end segment of the connecting member. The spade is further rotated or positioned about the angled end segment. The spade further includes a curved region. The combination of the angle, rotation, and curved region provides for an improved, manually operable edging tool that increases operator comfort and efficiency while resulting in a high-quality edge.

The spade and the connecting member may be comprised of metal. The handle may be comprised of wood, plastic, resin, or metal. The handle may include a comfort grip material. Further, the spade may have sharp or sharpened edges for cutting purposes. The edging apparatus may also include a hanger for allowing the apparatus to hang for storage, for example on a wall.

Among other advantages, to create an edge around a garden or flower bed, a user simply makes a cut in the ground and pulls the angled edging apparatus in a raking motion to define the actual edge. Dirt, soil, etc. is ground up along the way, reducing, or even eliminating, the presence of large chunks, thereby reducing, or even eliminating, the need for cleaning up and/or removing such chunks in order to improve the appearance of the completed edge and landscaping feature. In this regard, the angled edging apparatus is more efficient and effective to use than traditional edging tools such as a half-moon edger.

BRIEF DESCRIPTION OF THE DRAWINGS

The embodiments will be more readily understood in view of the following description when accompanied by the below figures and wherein like reference numerals represent like elements.

DETAILED DESCRIPTION OF THE PREFERRED EMBODIMENTS

Figure 1:
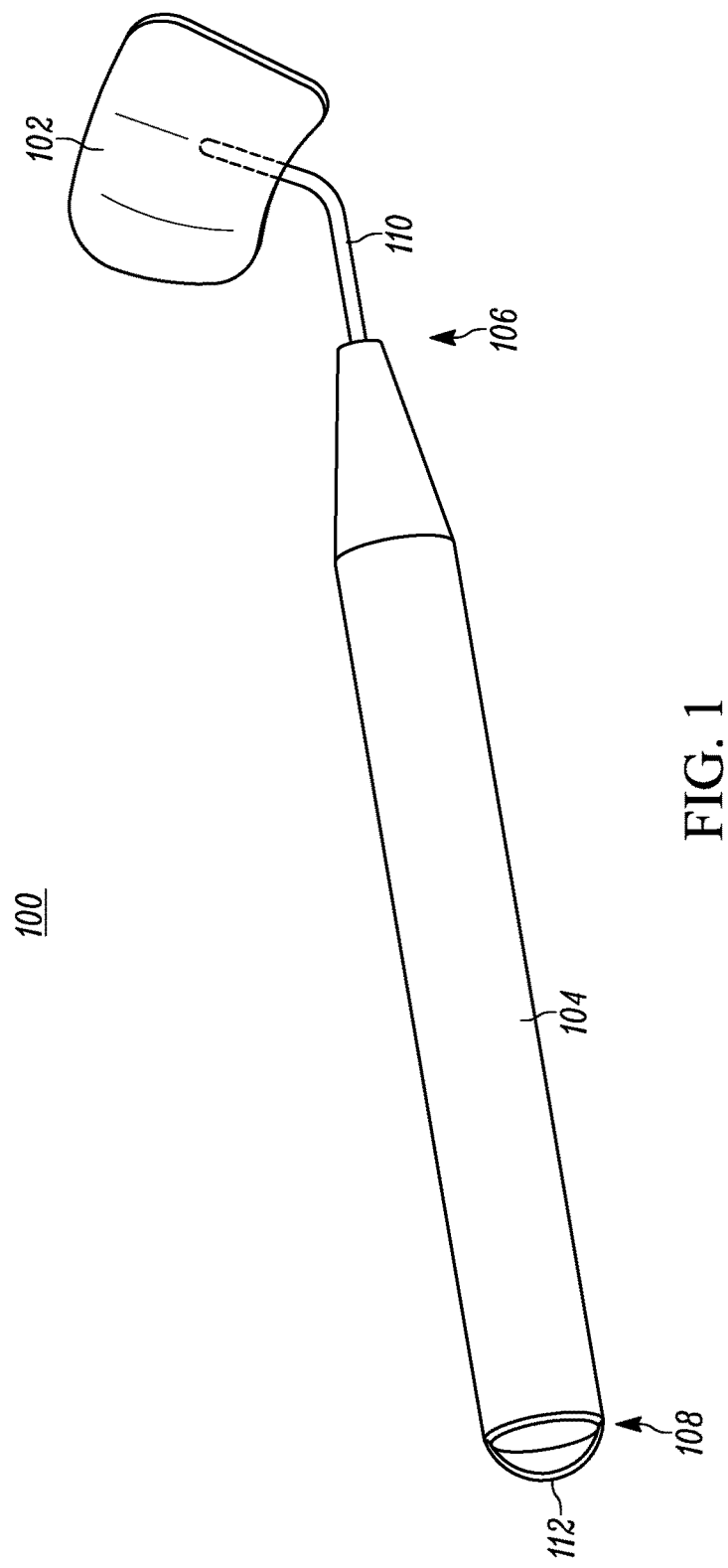
FIG. 1 is a perspective view of an angled edging apparatus.

While this invention is susceptible of embodiments in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

FIG. 1 is a perspective view of an example angled edging apparatus or edger 100. Angled edging apparatus 100 comprises a spade 102 and a handle 104. Handle 104 has a first end 106 and a second end 108. First end 106 of handle 104 includes a connecting member or rod 110. Spade 102 is attached to connecting member 110. Spade 102 can be attached to connecting member 110 by any suitable manner, including, for example, by welding.

In some embodiments, handle 104 and connecting member 110 are separate components. For example, handle 104 can be attached to connecting member 110 by any suitable manner, including, for example, by inserting connecting member 110 into a matching cavity in handle 104 and affixing the two together by mechanical fastening and/or adhesive, as is known in the art. In this manner, spade 102 is coupled to handle 104 via connecting member 110.

Spade 102 and connecting member 110 may be comprised of metal or another suitable material. Handle 104 may be comprised of any suitable material such as wood, plastic, resin, metal, etc.

Spade 102 may be generally rectangular in shape (as used herein, generally rectangular in shape includes generally square in shape). Handle 104 may include a comfort grip material (e.g., a foam or rubber coating, covering, or insert, etc.) to provide a softer gripping surface for a user. Handle 104 may also include a hanger (e.g., a hanging ring or hanging hole) 112 that can be used to hang apparatus 100 for storage purposes, such as on a wall, door, or rack.

Figure 2:
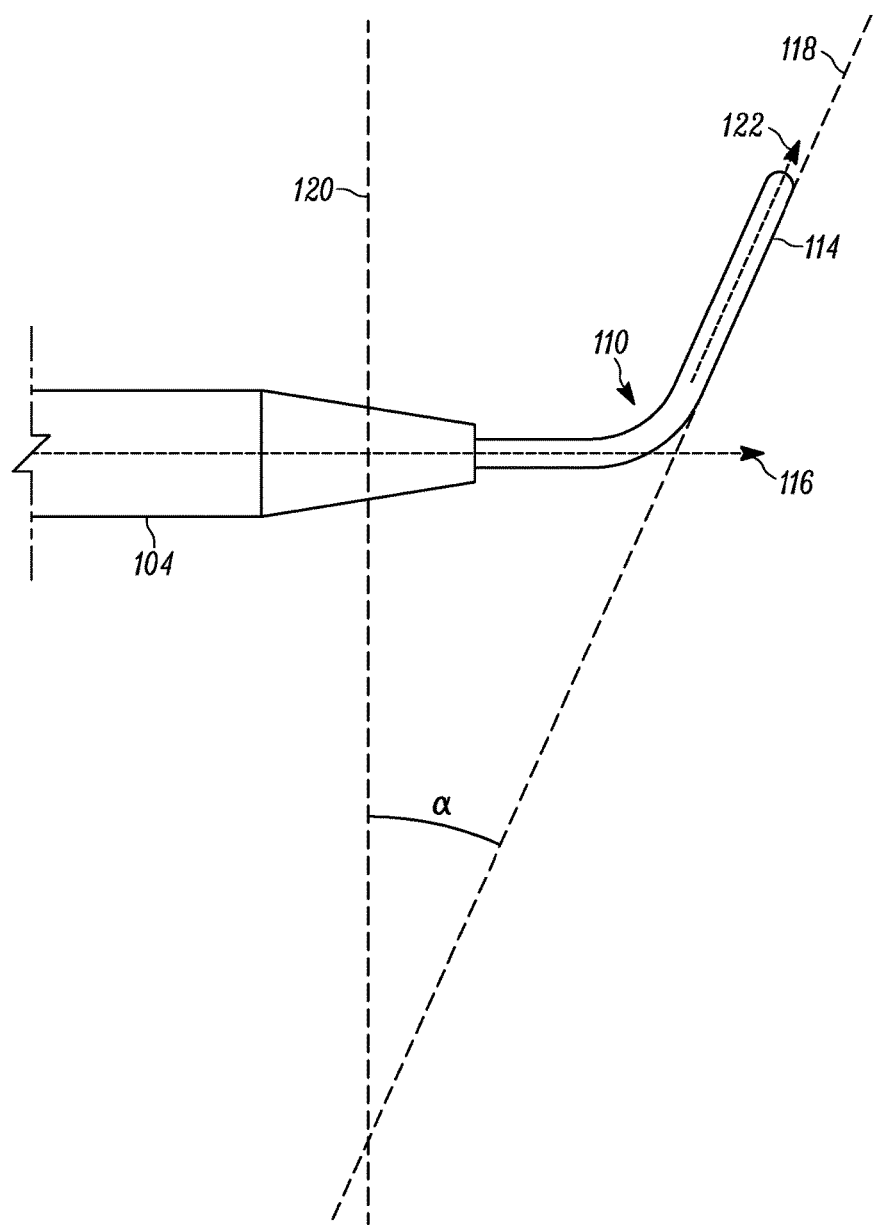
FIG. 2 is a close-up view of the angled edging apparatus without the spade.

FIG. 2 is a close-up, side view of the apparatus of FIG. 1, with spade 102 removed for ease of reference. As shown in FIG. 2, connecting member 110 has a curved or bent shape, the effect of which is that connecting member 110 has an end segment 114 that is angularly displaced with respect to handle 104 at an angle α. Angle α is defined as an angle between a first plane 118 and a second plane 120. First plane 118 is parallel to angularly displaced end segment 114 and includes a longitudinal axis 122 of end segment 114. Second plane 120 is normal or perpendicular to a longitudinal axis 116 of handle 104. Angle α can be between 20 and 35 degrees, preferably about (or approximately) 30 degrees, and most preferably 30 degrees.

Figure 3:
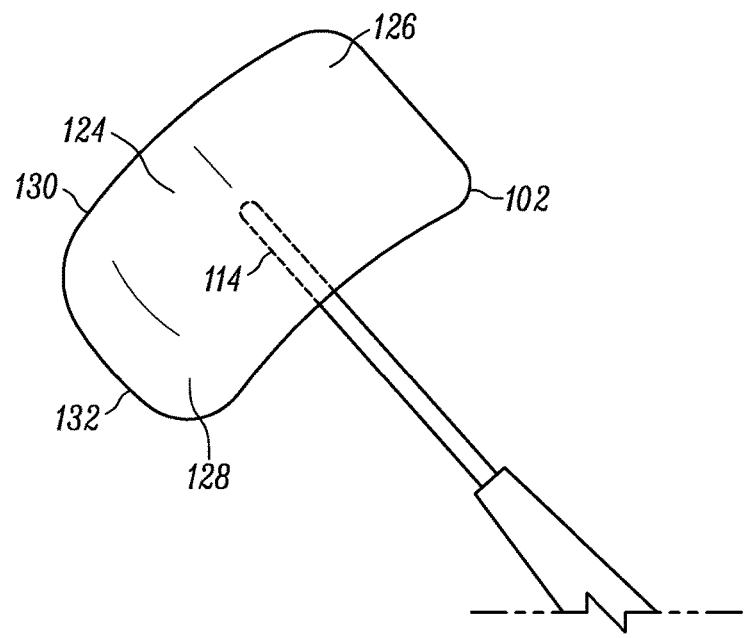
FIG. 3 is a close-up view of the angled edging apparatus with the spade.

FIG. 3 is a close-up view of the apparatus of FIG. 1 with spade 102. As shown in FIG. 3, spade 102 includes a first portion 124 and a second portion 126. Second portion 126 is continuous with and opposite of first portion 124. First portion 124 has a curved region 128. The purpose of curved region 128 is to redirect any ground up dirt or soil during the edge making process.

First portion 124 can also have one or more sharp or sharpened edges used for various cutting purposes, including cutting into the ground to begin the edge formation. In particular, first portion 124 can include a sharpened outer edge 130 and a sharpened side edge 132. Sharpened outer edge 130 can include all or part of first portion 124 and second portion 126. Side edge 132 can be sharpened along all or part of its length. In practice, the preferred sharpening pattern includes substantially all of side edge 132 and a portion of outer edge 130 nearest side edge 132, creating a continuous sharpening that spans the juncture between side edge 132 and outer edge 132.

Figure 4:
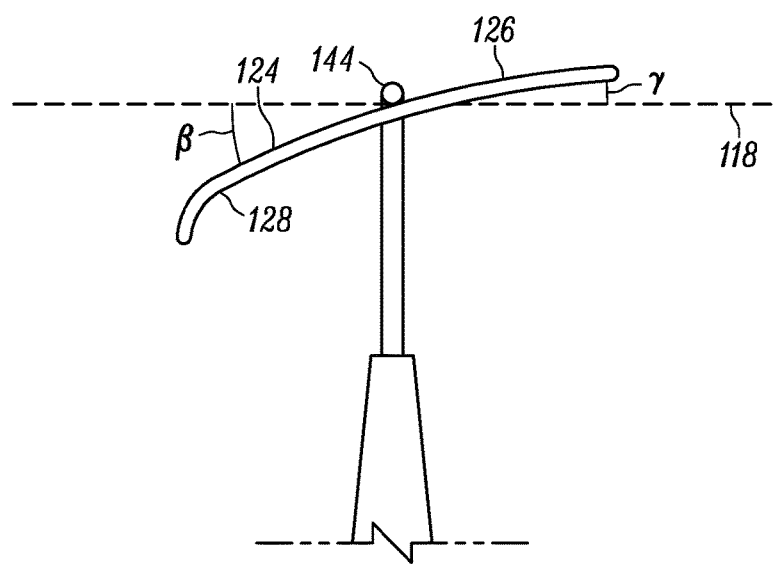
FIG. 4 is a close-up view of the angled edging apparatus showing the orientation of the spade.

FIG. 4 is a close-up view of the apparatus of FIG. 1, showing the orientation of spade 102. As shown in FIG. 4, first portion 124 is rotated or positioned about angularly displaced end segment 114 at an angle β from first plane 118 in a direction toward handle 104. Second portion 126 is rotated or positioned about angularly displaced end segment 114 at an angle γ from first plane 118 in a direction away from handle 104. Angle β can be between 40 and 60 degrees, preferably about (or approximately) 50 degrees, and most preferably 50 degrees. Angle γ can be between 20 and 40 degrees, preferably about (or approximately) 30 degrees, and most preferably 30 degrees.

In some embodiments, angled edging apparatus 100 comprises spade 102 and handle 104 including connecting member 110. Spade 102 is attached to angularly displaced end segment 114 of connecting member 110. Spade 102 is rotated or positioned about angularly displaced end segment 114 at angle β from first plane 118 in a direction toward handle 104. Spade 102 also includes curved region 128.

Using angled edging apparatus 100 to create an edge or boundary around a garden or other landscaping feature is straightforward. First, with spade 102, a user makes a cut in the ground at a desired location where the edge or boundary will be set up. Next, the user pulls angled edging apparatus 100 in a raking or sweeping motion along a path to define the actual edge or boundary. As edger 100 is pulled along the path, spade 102 grinds up displaced dirt or soil. Displaced dirt or soil tends to be deposited along the banks of the path, lessening or even eliminating the need to further handle or clean up such material for improving the appearance of the completed edge or boundary. In this manner, the user can establish and maintain the edge or boundary while expending less energy and/or time.

As compared to a half-moon edger or other non-angled tool, apparatus 100 saves time and energy by reducing or eliminating the need for repetitive, separate cutting/digging actions along the edge or border in favor of a more continuous raking or sweeping motion. Further, the repetitive, separate cutting/digging actions with known tools typically results in a series of larger clumps of dirt or soil, which must then be dealt with, either by picking them up and removing them, or by breaking them up into smaller pieces to remain in the garden or landscaping feature, for example. In practice, time spent to create edges around a typical, professionally-landscaped garden has been decreased from as much as 16 man hours (e.g., by using a traditional half-moon edger) to as few as 4 man hours by using angled edging apparatus 100.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. An apparatus comprising:
   a spade; and
   a handle having a first end and a second end, the first end including a connecting member;
   the connecting member having an end segment that is angularly displaced with respect to the handle by an angle α, wherein α is defined as an angle between a first plane parallel to the angularly displaced end segment and a second plane normal to a longitudinal axis of the handle, and wherein the first plane includes a longitudinal axis of the angularly displaced end segment;
   the spade being attached to the angularly displaced end segment and having a first portion and a second portion, wherein:
      the first portion is positioned about the angularly displaced end segment at an angle β from the first plane in a direction toward the handle,
      the second portion is positioned about the angularly displaced end segment at an angle γ from the first plane in a direction away from the handle,
      the first portion includes a curved region, and
      wherein a magnitude of the angle γ is less than a magnitude of the angle β, where β and γ are non-zero values.

2. The apparatus of claim 1, wherein the angle α is between 20 and 35 degrees.

3. The apparatus of claim 1, wherein the angle β is between 40 and 60 degrees.

4. The apparatus of claim 1, wherein the angle γ is between 20 and 40 degrees.

5. The apparatus of claim 1, wherein the angle α is between 20 and 35 degrees, the angle β is between 40 and 60 degrees, and the angle γ is between 20 and 40 degrees.

6. The apparatus of claim 5, wherein at least the first portion of the spade has a sharpened edge.

7. The apparatus of claim 6, wherein the spade is generally rectangular in shape.

8. The apparatus of claim 1, wherein the angle α is approximately 30 degrees, the angle β is approximately 50 degrees, and the angle γ is approximately 30 degrees.

9. The apparatus of claim 8, wherein at least the first portion of the spade has a sharpened edge.

10. The apparatus of claim 9, wherein the spade is generally rectangular in shape.

11. The apparatus of claim 1, wherein the spade and the connecting member are comprised of metal, and the handle is comprised of any one of: wood, plastic, resin, or metal.

12. The apparatus of claim 1, wherein the handle comprises a comfort grip material.

13. The apparatus of claim 1, further comprising a hanger for allowing the hanging of the apparatus.

14. The apparatus of claim 1, wherein at least the first portion of the spade has a sharpened edge.

15. The apparatus of claim 1, wherein the spade is generally rectangular in shape.

16. The apparatus of claim 1, wherein the magnitude of the angle γ is at least 5 degrees less than the magnitude of the angle β.

17. The apparatus of claim 1, wherein the magnitude of the angle γ is at least 10 degrees less than the magnitude of the angle β.

* * * * *